(No Model.)
C. WAGONER.
TOASTER OR BROILER.
No. 547,593. Patented Oct. 8, 1895.
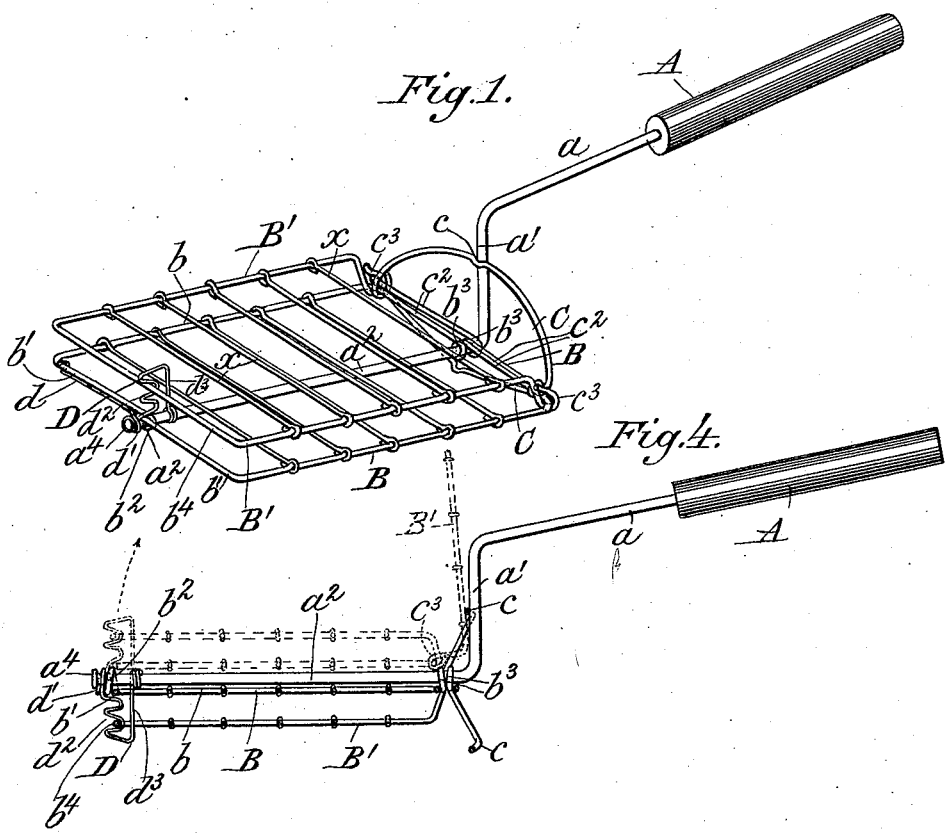
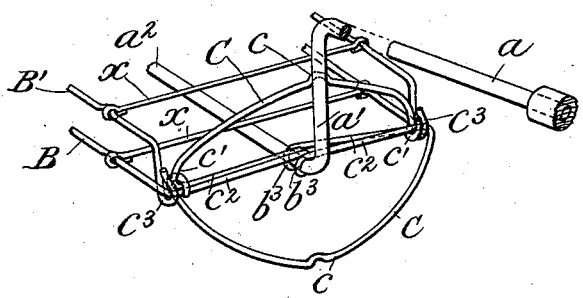
Attest:
F. H. Schott
Bruce S. Elliott
Inventor:
Charles Wagoner
by Grant Burroughs
atty

UNITED STATES PATENT OFFICE.

CHARLES WAGONER, OF WORCESTER, NEW YORK, ASSIGNOR OF ONE-THIRD TO DEWITT C. BEST, OF SAME PLACE.

TOASTER OR BROILER.

SPECIFICATION forming part of Letters Patent No. 547,593, dated October 8, 1895.

Application filed April 27, 1895. Serial No. 547,360. (No model.)

*To all whom it may concern:*

Be it known that I, CHARLES WAGONER, a citizen of the United States, residing at Worcester, in the county of Otsego and State of New York, have invented certain new and useful Improvements in Toasters or Broilers, of which the following is a full, clear, and exact description, such as will enable those skilled in the art to which it appertains to construct the same, reference being had to the accompanying drawings.

The invention relates to improvements in broilers or toasters of that class in which the gridiron is formed of two leaves hinged together and is rotatably mounted on a depressed extension of the shank of its handle, so that the gridiron can be inserted in a stovehole and held parallel with the surface of the coals.

It has for its object the provision of such a device with catches of novel construction whereby the gridiron can be securely locked in place when it is adjusted relatively to the handle to have one or the other of its faces presented to the action of the fire.

It also has for its object the provision of a catch of novel construction whereby the leaves of the gridiron can be securely locked at their free ends when brought together.

It has further for its object the construction of such a device as will be cheap in construction, particularly adapted to its use, and of easy manipulation.

It consists in the novel construction, combination, and arrangement of parts, such as will be hereinafter fully described, pointed out in the appended claims, and illustrated in the accompanying drawings.

In the accompanying drawings, in which similar letters of reference designate corresponding parts, Figure 1 is a perspective view of a device embodying the invention. Fig. 2 is a detail perspective view, enlarged, showing the catches which secure the gridiron against accidental turning. Fig. 3 is an enlarged detail view showing the catch which locks the leaves of the gridiron together. Fig. 4 is a side elevation showing in full and dotted lines the leaves in several different adjustments.

Referring to the drawings by letter, A designates the handle, the shank $a$ of which has a portion $a'$ bent at right angles to the main handle. An extension $a^2$ is bent at right angles from the part $a'$. On the extension the gridiron is rotatably mounted. The latter is composed of two leaves B and B', hinged together. The main leaf B is journaled, by means of bearings formed in its frame, on the extension $a^2$, and it has the leaf B' hinged to its rear end. The frame $b$ of the main leaf is formed of a single piece of wire of the necessary stoutness. In its forward cross-bar $b'$ is formed the bearing $b^2$, in which the end of the extension $a^2$ is journaled. This bearing is formed by coiling the wire around the extension in the manner shown. The ends of the wire forming the frame are respectively coiled at $b^3$ $b^3$ around the rear end of the extension $a^2$, forming thereby a double bearing. The wires are then continued to opposite sides and form a double rear cross-bar for the leaf. In the ends of the remaining wire are formed the catches C C, which extend from the gridiron on opposite sides. They are substantially segments of circles in form and extend outwardly and toward the handle, so that when the gridiron is in position to present one face or the other to the fire the upper catch will press against the portion $a'$ of the shank, and by reason of the detent $c$ engaging with the said portion the gridiron will be secured against any accidental rotation. The ends of the wire are crimped at $c'$ $c'$ around the ends of the double cross-bars $c^2$ $c^2$ and firmly unite the same. The ends of the wire forming the frame of the other leaf are crimped or looped at $c^3$ $c^3$ around the rear cross-bar of the main leaf and form the hinge connecting the leaves. The cross-bars $xx$ of the leaves may be secured to their respective frames in any manner suitable in the premises. The end of the extension $a^2$ is headed so as to prevent the displacement of the gridiron. A novel catch D is provided for locking the leaves when they are closed. It consists of a piece of wire of an inverted-U-shaped form having its ends coiled around the extension $a^2$. It is held in its perpendicular position relatively to the main leaf B by the lateral arm $d$, which extends along the cross-bar $b'$ and is secured at its outer end to the same. By interposing the coil $d'$ between the cross-bar $b'$ and the head $a^4$ of the extension longitudinal movement of the catch on the extension is prevented. The front leg $d^2$ is detented and is adapted to engage with the cross-bar $b^4$ of the leaf $B'$. The detents allow the leaves to be closed more or less as the thickness of the material held between them may require. The other leg $d^3$ forms a brace to the front leg and it moves back and forth on the extension $a^2$ as the catch is moved to allow its engagement with the cross-bar $b^4$.

Having thus described my invention, what I claim, and desire to secure by Letters Patent, is—

1. In a toaster, or broiler, the combination of the handle having a portion of its shank depressed and extended, the gridiron rotatably mounted on the extension, and the catches projecting from the gridiron and adapted to engage with the handle to hold the said gridiron in its adjusted position, the said catches being formed of wire segmentally curved and having detents in the same to engage with the shank of the handle, substantially as described.

2. In a toaster, or broiler, the combination of the handle having a portion of its shank depressed and extended, the gridiron formed of leaves hinged together, rotatably mounted on the said extension, and the spring catch adapted to lock the leaves when closed, the said catch consisting of the detented standard mounted on the extension of the shank, and having a lateral arm secured to the frame of the main leaf of the gridiron to hold the standard in an upright position, substantially as described.

I hereby affix my signature in the presence of two witnesses.

CHARLES WAGONER.

Witnesses:
JOHN R. BOYCE,
ARTHUR SHAFER.